Patented Oct. 28, 1930

1,779,460

UNITED STATES PATENT OFFICE

ROBERT M. BAGLEY, OF HADDONFIELD, NEW JERSEY, ASSIGNOR TO THE R. M. HOLLINGSHEAD CO., A CORPORATION OF NEW JERSEY

HYDRAULIC-BRAKE FLUID

No Drawing.   Application filed March 8, 1929. Serial No. 345,612.

My invention relates more particularly to a novel liquid composition of matter, adapted for use as a hydraulic medium in hydraulic brake systems.

In the operation of hydraulic brake systems employing a liquid medium for the transmission and distribution of the operating force, it is desirable to have a medium which will be particularly adapted for a wide range of temperatures and which will be practically inert with respect to the materials composing the various parts of the brake system and mechanism. In addition, it is desirable that the liquid brake medium should have lubricating qualities sufficient to afford proper lubrication to the moving parts of the brake system.

The object of my invention is to provide a liquid composition of matter for use as a hydraulic brake fluid medium, which will afford a suitably low freezing point, so that it will not congeal in winter; which will have a suitably high vapor pressure so that it will not volatilize unduly at the higher summer or tropical temperatures; which will afford good lubricating qualities and which will possess a suitable degree of viscosity over the entire range of temperature, at which the brake system may be used; and which will be inert with respect to and have no deteriorating or corrosive effect either upon rubber or upon metals, particularly copper, composing the various parts of the brake system and mechanism.

To attain all of the above objects in a liquid composition of matter, I have discovered a mixture composed of ethyleneglycolmonoethylether and a suitable inert lubricating liquid soluble therein.

Thus I may produce my novel composition, by mixing with ethyleneglycolmonoethylether, a suitable proportion of castor oil or glycerine, or both. Thus I may mix ethyleneglycolmonoethylether in equal proportions with either castor oil or glycerine or with equal proportions of a mixture of castor oil and glycerine. The exact proportion of the oily constituents to be mixed with the ethyleneglycolmonoethylether depends upon the particular range of the temperatures for which the composition is to be adapted. Thus for extremely low range of temperatures a smaller proportion of the oily constituents is required, while for the higher range of temperatures a greater proportion of oily constituents may be employed.

I have found in practise that this novel liquid composition of matter, comprising a mixture of suitable proportions of ethyleneglycolmonoethylether and a relatively inert lubricating or oily substance, such as castor oil or glycerine, or both, possesses all the desired and requisite qualities of a brake liquid for hydraulic brakes, to a greater degree than the various liquid mixtures heretofore employed for this purpose.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I hereby claim as new and desire to secure by Letters Patent is:—

1. A liquid composition including ethyleneglycolmonoethylether and a relatively inert oily substance soluble therein.

2. A liquid composition including ethyleneglycolmonoethylether and glycerine.

3. A liquid composition including ethyleneglycolmonoethylether, glycerine and castor oil.

4. A liquid composition including ethyleneglycolmonoethylether and castor oil.

In witness whereof I have hereunto set my hand this 1st day of February, 1929.

ROBERT M. BAGLEY.